(12) United States Patent
Yin

(10) Patent No.: US 9,544,215 B2
(45) Date of Patent: Jan. 10, 2017

(54) METHOD AND APPARATUS FOR EVALUATING PERFORMANCE OF WIRELESS NETWORK CAPILLARY CHANNEL

(71) Applicant: ZTE Corporation, Shenzhen, Guangdong (CN)

(72) Inventor: Jianhua Yin, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/439,718

(22) PCT Filed: Sep. 9, 2013

(86) PCT No.: PCT/CN2013/083155
§ 371 (c)(1),
(2) Date: Apr. 30, 2015

(87) PCT Pub. No.: WO2014/067347
PCT Pub. Date: May 8, 2014

(65) Prior Publication Data
US 2015/0288594 A1    Oct. 8, 2015

(30) Foreign Application Priority Data

Oct. 31, 2012    (CN) .......................... 2012 1 0427942

(51) Int. Cl.
*H04L 12/26*    (2006.01)
*H04W 24/08*    (2009.01)
(Continued)

(52) U.S. Cl.
CPC ............ *H04L 43/50* (2013.01); *H04L 41/142* (2013.01); *H04L 43/08* (2013.01); *H04L 69/16* (2013.01);
(Continued)

(58) Field of Classification Search
None
See application file for complete search history.

(56) References Cited

U.S. PATENT DOCUMENTS 7,882,231 B2    2/2011 Burkard
2007/0242702 A1*  10/2007 Shim .................. H04L 12/2602
370/516
(Continued)

FOREIGN PATENT DOCUMENTS

CN    101617486 A    12/2009
CN    102067547 A    5/2011
(Continued)

OTHER PUBLICATIONS

International Search Report in international application No. PCT/CN2013/083155, mailed on Dec. 12, 2013.
(Continued)

*Primary Examiner* — Chi H Pham
*Assistant Examiner* — Fahmida Chowdhury
(74) *Attorney, Agent, or Firm* — Oppedahl Patent Law Firm LLC

(57) ABSTRACT

A method and an apparatus for evaluating performance of a wireless network capillary channel are described, and relate to the field of mobile communications. The method may include: it is determined whether a network packet includes a payload or not, after obtaining the network packet on the wireless network capillary channel; when determining that the network packet includes the payload, retransmission rate and packet loss rate statistic processing, disorder rate statistic processing, and packet capture process packet loss rate statistic processing are performed; and when determining that the network packet does not include the payload, the packet capture process packet loss rate statistic processing is
(Continued)

directly performed. The disclosure can evaluate channel performance better in a finer layer.

11 Claims, 4 Drawing Sheets

(51) Int. Cl.
  *H04W 24/04* (2009.01)
  *H04L 29/06* (2006.01)
  *H04L 12/24* (2006.01)
  *H04W 84/04* (2009.01)
(52) U.S. Cl.
  CPC ............. *H04W 24/04* (2013.01); *H04W 24/08* (2013.01); *H04L 43/0829* (2013.01); *H04L 43/0894* (2013.01); *H04W 84/042* (2013.01)

(56) References Cited

U.S. PATENT DOCUMENTS

| | | | |
|---|---|---|---|
| 2008/0212487 A1* | 9/2008 | Silvestri | ............... H04L 69/16 370/253 |
| 2009/0276518 A1 | 11/2009 | Burkard | |
| 2011/0085466 A1 | 4/2011 | Shim | |
| 2011/0211464 A1 | 9/2011 | Chetlur | |
| 2014/0003277 A1 | 1/2014 | Shim | |

FOREIGN PATENT DOCUMENTS

| | | |
|---|---|---|
| CN | 102662907 A | 9/2012 |
| JP | 2005210515 A | 8/2005 |
| JP | 2006186889 A | 7/2006 |
| JP | 2007274282 A | 10/2007 |
| JP | 2007336551 A | 12/2007 |
| JP | 2008017407 A | 1/2008 |
| JP | 2009182430 A | 8/2009 |
| JP | 2009206762 A | 9/2009 |
| JP | 2010124127 A | 6/2010 |
| JP | 2012186780 A | 9/2012 |
| WO | 2008058130 A2 | 5/2008 |
| WO | 2011104225 A1 | 9/2011 |
| WO | 2011115625 A1 | 9/2011 |

OTHER PUBLICATIONS

English Translation of the Written Opinion of the International Search Authority in international application No. PCT/CN2013/083155, mailed on Dec. 12, 2013.

Supplementary European Search Report in European application No. 13852099.4, mailed on Nov. 25, 2015.

* cited by examiner

METHOD AND APPARATUS FOR EVALUATING PERFORMANCE OF WIRELESS NETWORK CAPILLARY CHANNEL

TECHNICAL FIELD

The disclosure relates to the field of mobile communications, and particularly to a method for evaluating fine-granted performance of a capillary channel on an end-to-end whole course transmission path of a wireless network, and a relevant apparatus thereof.

BACKGROUND

With deployment and maturity of a 3G/4G network, explosive increment of a data service will appear. However, because of increasing popularization of a global smart phone and rapid development of an application market, an operator encounters a risk of channelization. A plenty of network flow is occupied by a newly added network application quickly, while service revenues of the operator is not duly increased.

Under this background, a concept of flow management is proposed by the operator and an equipment manufacturer correspondingly, an intent of which is to deeply explore a flow characteristic in a network, to perform targeted popularization and implementation of a business marketing scheme, thus maximizing management benefit. A premise of the flow management is that performance of various services in the network is needed to be accurately measured in real time, so as to adopt a targeted flow management measure in time, and implement optimization of resource occupation under a premise that service performance of a user specific service is met, thus increasing total value of operation.

A method for evaluating channel performance, which is adopted currently, performs post treatment and analysis, mainly based on a Deep Packet Inspection (DPI) technique, and in combination with statistic data of an Operation Support System (OSS). A defect of this method is that definition of a channel is rough, and can only reach to a level of service type aggregation, for example distinguishing a difference between a webpage browsing service and a video browsing service, an effective statistic of the channel performance in a finer layer cannot be made.

SUMMARY

In view of this, a main purpose of an embodiment of the disclosure is to provide a method and an apparatus for evaluating performance of a wireless network capillary channel, which can evaluate channel performance better in a finer layer.

In order to achieve the above purpose, a technical scheme of an embodiment of the disclosure is implemented as follows.

According to an aspect of the disclosure, an embodiment of the disclosure provides a method for evaluating performance of a wireless network capillary channel, which includes:

determining whether a network packet includes a payload or not, after obtaining the network packet on the wireless network capillary channel;

when determining that the network packet includes the payload, performing retransmission rate and packet loss rate statistic processing, disorder rate statistic processing, and packet capture process packet loss rate statistic processing; and when determining that the network packet does not include the payload, directly performing the packet capture process packet loss rate statistic processing.

Preferably, the method may further include: performing service module related index statistic processing; which includes:

calculating a time difference between the network packet and a previous packet of the network packet which includes the payload, comparing the obtained time difference with a predetermined time difference, making a statistic of a service module related index of a sleep state or a burst state according to a compare result, and making a statistic of aging time of all packets in a packet sequence number hole list.

Preferably, the method may further include: performing service module related index statistic processing; which includes:

determining whether a time statistic interval in which the network packet is located and a time statistic interval of a previous packet of the network packet which includes the payload are continuous or not, making a statistic of a service module related index of a sleep state or a burst state and making a statistic of aging time of all packets in a packet sequence number hole list according to a determination result.

Preferably, the method may include comparing a packet sequence number of the network packet with a next expected packet sequence number;

when the packet sequence number of the network packet is less than the next expected packet sequence number, performing the retransmission rate and packet loss rate statistic processing, and the disorder rate statistic processing;

when the packet sequence number of the network packet is equal to the next expected packet sequence number, updating the next expected packet sequence number to a sum of the packet sequence number and a packet length of the network packet, and performing the packet capture process packet loss rate statistic processing; and when the packet sequence number of the network packet is greater than the next expected packet sequence number, updating the next expected packet sequence number to the sum of the packet sequence number and the packet length of the network packet, and adding a newly generated hole into the packet sequence number hole list.

Preferably, the performing the retransmission rate and packet loss rate statistic processing may include:

when the packet sequence number of the network packet is in the packet sequence number hole list and the aging time is greater than predetermined aging time, making a statistic of a retransmission packet number of an upstream/downstream packet which includes the payload; and when the packet sequence number of the network packet is not in the packet sequence number hole list, making a statistic of the retransmission packet number of a downstream/upstream packet which includes the payload.

Preferably, the performing the disorder rate statistic processing may include:

when the packet sequence number of the network packet is in the packet sequence number hole list and the aging time is less than the predetermined aging time, making a statistic of a number of a transient disorder packet.

Preferably, the performing the packet capture process packet loss rate statistic processing may include:

when an uplink/downlink Acknowledgement (ACK) number included in the network packet is greater than a previous downlink/uplink acknowledged packet sequence number, comparing the uplink/downlink ACK number included in the network packet with a hole sequence number in the packet sequence number hole list; according to a comparison result, making a statistic of a total number of a lost packet during a packet capture process, and updating the packet sequence number hole list.

Preferably, the capillary channel may be a Transmission Control Protocol (TCP) connection initiated by a user.

According to another aspect of the disclosure, an embodiment of the disclosure provides an apparatus for evaluating performance of a wireless network capillary channel, which includes:

a service module statistic module, configured to determine whether a network packet includes a payload or not, after obtaining the network packet on the wireless network capillary channel;

a retransmission rate and packet loss rate statistic module, configured to perform retransmission rate and packet loss rate statistic processing when determining that the network packet includes the payload;

a disorder rate statistic module, configured to perform disorder rate statistic processing when determining that the network packet includes the payload; and a packet capture process packet loss rate statistic module, configured to perform packet capture process packet loss rate statistic processing.

Preferably, the service module statistic module may be further configured to make a statistic of a service module related index of a sleep state or a burst state.

Comparing with the related art, the technical scheme provided by the embodiment of the disclosure at least has the following advantages:

1: the disclosure perform analysis by using offline packet capture data, and does not has a high requirement of real time, therefore statistic of a TCP performance index of capillary channel granularity can be made;

2: the disclosure can provide a service module of each capillary channel, so as to obtain the statistic of a needed service module on a higher granularity through aggregation and analysis; conversely, the statistic of the service module on a fine granularity cannot be obtained through the statistic of the service module on a coarse granularity;

3: the disclosure makes a statistic of retransmission rate and packet loss rate, and can distinguish an uplink and a downlink, and can further distinguish whether packet loss or retransmission occurs before or behind a packet capture interface;

4: the disclosure can make a statistic of an uplink and downlink disorder rate;

5: the disclosure can make a statistic of packet loss due to various reasons during a packet capture process, and thus evaluates whether obtained data are integrated and can be used in a subsequent analysing and calculating process; and 6: all the statistics of the disclosure are calculated by a program, and the disclosure has good guiding significance with regard to rapid intelligent diagnosis of a network performance problem.

BRIEF DESCRIPTION OF THE DRAWINGS

FIG. 6($b$) is a view of contraction of a transmission sequence number hole at a time t2 which is provided in an embodiment of the disclosure;

FIG. 6($c$) is a view of fission of a transmission sequence number hole at a time t3 which is provided in an embodiment of the disclosure.

DETAILED DESCRIPTION

A preferred embodiment of the disclosure is illustrated in detail below in combination with the drawings, and it shall be understood that the preferred embodiment illustrated below is only used to illustrate and explain the disclosure, and is not used to limit the disclosure.

An embodiment of the disclosure takes each Transmission Control Protocol (TCP) connection initiated by each user as a channel having a finer granularity for research, which is called a capillary channel, and evaluates performance of a full-automatic TCP capillary channel through packet capture data based on a wireless network Packet Switch (PS) domain standard interface. Obviously, a TCP channel is not a unique capillary channel, but the embodiment of the disclosure only analyses the performance of the capillary channel of the TCP.

Wherein, the wireless network includes but not limits to a wireless mode such as a Global System for Mobile Communications (GSM), a Universal Mobile Telecommunications System (UMTS), a Code Division Multiple Access (CDMA), a Time Division-Synchronous Code Division Multiple Access (TD-SCDMA), a Frequency Division Duplexing-Long Term Evolution (FDD-LTE), a Time Division Duplexing LTE (TDD-LTE), and etc. Aiming at different PS domain wireless networks, there is a certain difference between network interfaces for packet capture, for example, the GSM usually collects data at a Gb interface, the UMTS and the TD-SCDMA usually perform collection at an IuPS interface, while the ODMS usually perform collection at an Rp interface. Original data formats collected in various modes are slightly different, and usually are a PCAP format which is supported by a wireshark tool. The disclosure does not concern processing of a specific data format; currently a corresponding tool has been sold on a market, to abstracted a TCP layer network packet needed for performance analysis of the capillary channel from these packet capture data, regardless of how these TCP layer network packets are transmitted in a network after encapsulated layer by layer.

The disclosure is further illustrated in detail below in combination with FIG. 1 to FIG. 6.

Figure 1:
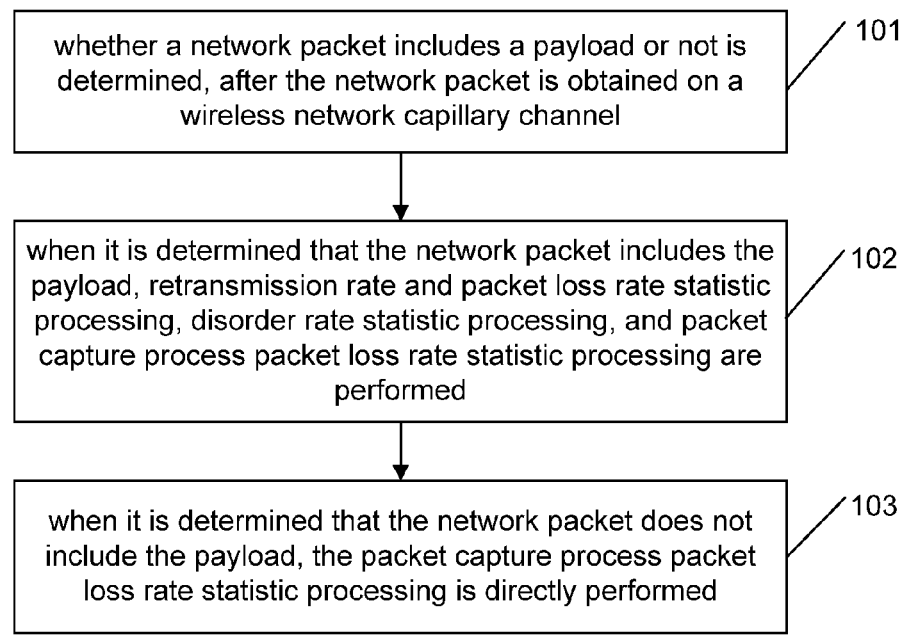
FIG. 1 is a schematic block diagram of a method for evaluating performance of a wireless network capillary channel which is provided in an embodiment of the disclosure.

FIG. 1 is a schematic block diagram of a method for evaluating performance of a wireless network capillary channel provided in an embodiment of the disclosure, as shown in FIG. 1, the method includes the following steps:

Step 101: it is determined whether a network packet includes a payload or not, after the network packet is obtained on a wireless network capillary channel;

Step 102: when it is determined that the network packet includes the payload, retransmission rate and packet loss rate statistic processing, disorder rate statistic processing, and packet capture process packet loss rate statistic processing are performed; and Step 103: when it is determined that the network packet does not include the payload, the packet capture process packet loss rate statistic processing is directly performed.

Specifically, a packet sequence number of the network packet and a next expected packet sequence number are compared. When the packet sequence number of the network packet is less than the next expected packet sequence number, the retransmission rate and packet loss rate statistic processing, and the disorder rate statistic processing are performed. When the packet sequence number of the network packet is equal to the next expected packet sequence number, the next expected packet sequence number is updated to a sum of the packet sequence number and a packet length of the network packet, and the packet capture process packet loss rate statistic processing is performed. When the packet sequence number of the network packet is greater than the next expected packet sequence number, the next expected packet sequence number is updated to a sum of the packet sequence number and the packet length of the network packet, and a newly generated hole is added into a packet sequence number hole list.

Wherein, when the packet sequence number of the network packet is in the packet sequence number hole list and aging time is greater than a predetermined aging time, a statistic of a retransmission packet number of an upstream/downstream packet including the payload is made. When the packet sequence number of the network packet is not in the packet sequence number hole list, the statistic of the retransmission packet number of a downstream/upstream packet including the payload is made. When the packet sequence number of the network packet is in the packet sequence number hole list and the aging time is less than the predetermined aging time, a statistic of the number of a transient disorder packet is made. When an uplink/downlink ACK number included in the network packet is greater than a previous downlink/uplink ACK packet sequence number, the uplink/downlink ACK number included in the network packet and a hole sequence number in the packet sequence number hole list are compared; according to a comparison result, a statistic of a total number of a lost packet during this capturing packet process is made, and the packet sequence number hole list is updated.

An apparatus for evaluating performance of a wireless network capillary channel provided by an embodiment of the disclosure includes: a part identical to the related art and a part different from the related art. Wherein, the part identical to the related art includes: a packet decoding module configured to complete decoding of each protocol layer, a single user signalling screening module configured to picking up packets belonging to a same user together, and a TCP capillary channel signalling screening module configured to picking up packets on a same TCP capillary channel belonging to the same user together.

Figure 2:
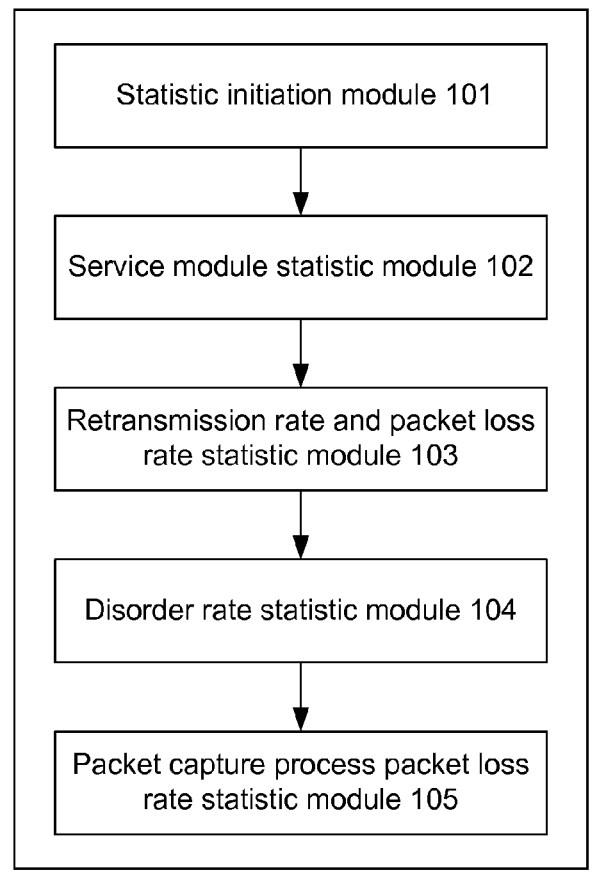
FIG. 2 is a structure view of an apparatus for evaluating performance of a wireless network capillary channel which is provided in an embodiment of the disclosure

The part different from the related art is shown in FIG. 2, and includes: a statistic initiation module 101, a service module statistic module 102, a retransmission rate and packet loss rate statistic module 103, a disorder rate statistic module 104, and a packet capture process packet loss rate statistic module 105. Wherein, The statistic initiation module 101 is configured to initiate various statistic parameters and internal variables when establishing a TCP connection.

The service module statistic module 102 is configured to determine whether a network packet includes a payload after the network packet is obtained on the wireless network capillary channel, and is also configured to make a statistic of a service module related index of a dormancy state or a burst state, which includes making a statistic of a service module related index, such as a total number of burst, a total number of sleep, a total time length of burst, a total time length of sleep and etc., and is also configured to make a statistic of the service module related index, such as a total number of the packet on a connection, a total number of the packet including the payload, a total number of sent bytes, and etc.

The retransmission rate and packet loss rate statistic module 103 is configured to perform retransmission rate and packet loss rate statistic processing when it is determined that the network packet includes the payload, that is an upstream and downstream retransmission rate and packet loss rate on an interface for packet capture are provided on a bi-directional passage of the TCP capillary channel.

The disorder rate statistic module 104 is configured to perform disorder rate statistic processing when it is determined that the network packet includes the payload, that is, an entire disorder rate of packet transmission is provided on the bi-directional passage of the TCP capillary channel.

The packet capture process packet loss rate statistic module 105 is configured to perform packet capture process packet loss rate statistic processing, that is, an entire packet loss rate due to an undesirable packet capture process.

As shown in FIG. 2, modules are executed in sequence, after module 101 is executed, aiming at each arrived uplink or downlink packet of the TCP, each of them executes the module 102, 103, 104, and 105. After each module is executed, an update and statistic of an internal state variable of the module may be made correspondingly, to track and maintain a current connection state. There is not a direct co-dependent relationship between the modules, but a prior executed module may influence a state of a later executed module by modifying a shared variable.

Figure 3:
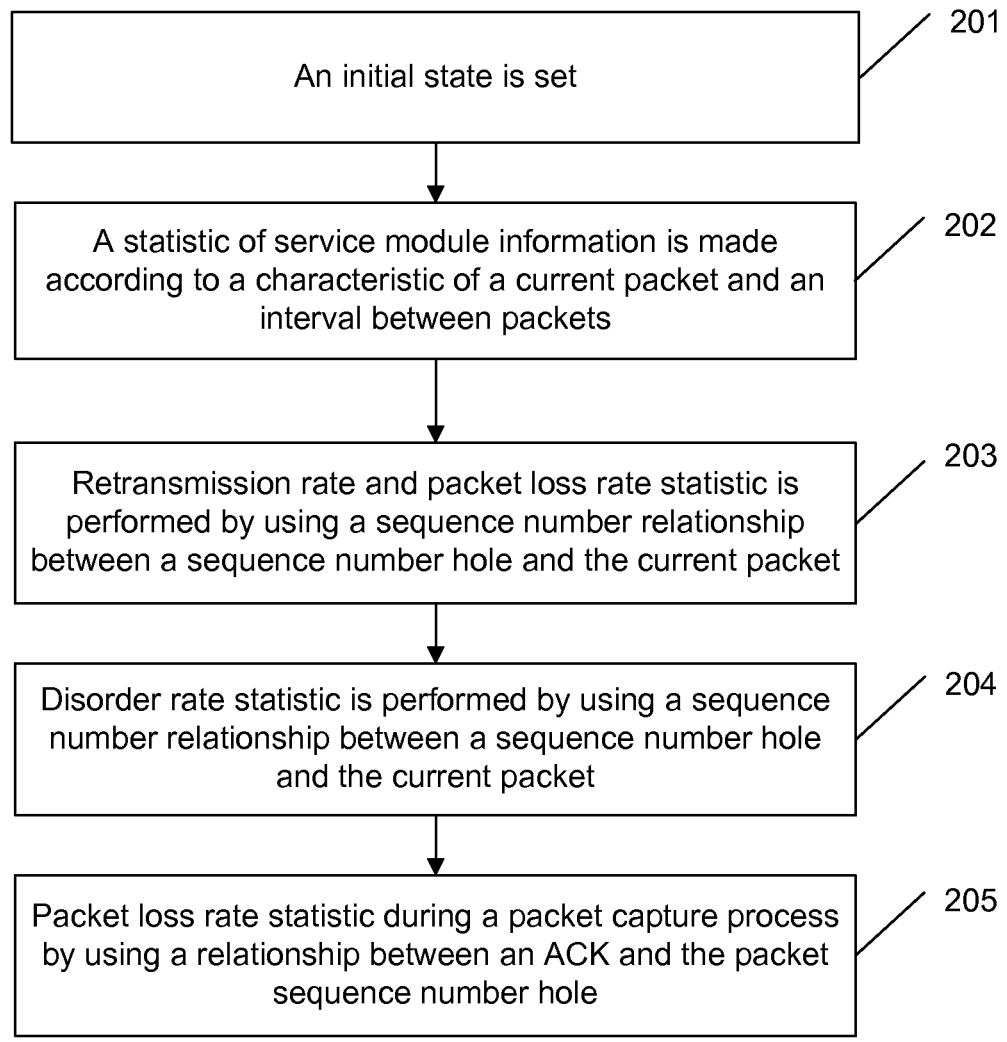
FIG. 3 is an operating flowchart of the apparatus for evaluating the performance of the wireless network capillary channel shown in FIG. 2.

FIG. 3 is an operating flowchart of the apparatus for evaluating the performance of the wireless network capillary channel shown in FIG. 2, and as shown in FIG. 3, this flow includes the following steps:

Step 201: when establishing a TCP connection, the statistic initiation module 101 is called to set an initial state. The step 201 assumes that a network pocket on the interface for pocket capture is filtered in accordance with a user dimension and a TCP channel dimension, and is directed input into the statistic initiation module 101.

Further, each capillary channel has its independent state variable, processing steps between the capillary channels do not influence each other. Two directions of the capillary channel, namely an uplink and a downlink, are recorded by using paired state variables.

Step 202: service module information on a current capillary channel is updated according to length information of each arrived packed and interval information between a previous packet and the arrived packed. If the current packet is an uplink packet, then an uplink related statistic is updated, otherwise a downlink related statistic is updated.

Step 203: a transmission sequence number hole list maintained in a certain direction (namely a packet sequence number hole list, which is called a packet hole for short) and whether a current arrived packet is in the packet hole or not are used, to determine whether the current packet is a retransmitted packet, and whether retransmission is performed in an upstream link or a downstream link of the interface for pocket capture.

Taking the pocket capture on an IuPS interface as an example, with regard to an uplink, the upstream link is a link from a User Equipment (UE) to the IuPS interface, and includes several network elements such as the UE, a Node B, and a RNC user plane, and a transmission path between the network elements; the downstream link is a link from the IuPS interface to a Content Provider (CP), and according to different topologies for networking, may include several network elements such as an SGSN, a GGSN, a WAP gateway, a Service Provider (SP) and the CP, and the transmission path between the network elements. With regard to a downlink, it is opposite to the uplink, namely the upstream link is from the CP to the IuPS interface, and the downstream link is from the IuPS interface to the UE.

A packet loss rate and a retransmission rate depend on a similar determination mechanism. With regard to each direction, finally a related packet loss rate and retransmission rate statistic state variable may be updated finally.

Step 204: similarly the packet hole and information of the currently arrived packet are used to determine whether the current packet is a temporary disorder packet, and disorder rate related statistic is updated.

Step 205: ACK information which corresponds to a receiver and is included in each TCP packet is used, to analyse whether the sequence number acknowledged by this packet belongs to a part of the packet hole, if yes, then it denotes that packet loss occurs during the packet capture process, and a statistic is made.

Figure 4:
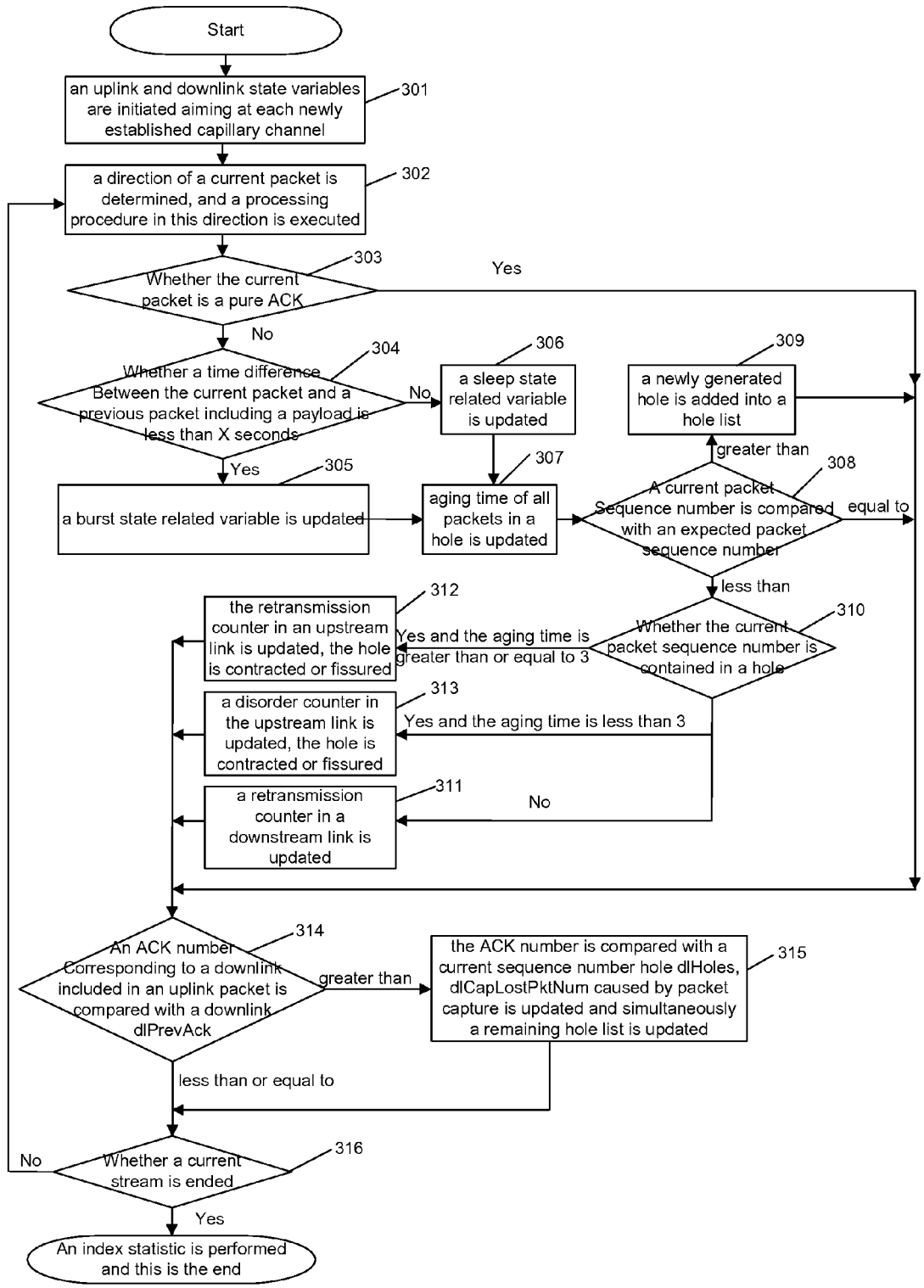
FIG. 4 is a view of a detailed implementation step for evaluating performance of a wireless network capillary channel which is provided in an embodiment of the disclosure.

FIG. 4 is a view of a detailed implementation step for evaluating the performance of the wireless network capillary channel which is provided in an embodiment of the disclosure, as shown in FIG. 4, the detailed implementation step includes:

Step 301: a corresponding state variable is initialized aiming at each newly created TCP capillary channel, which mainly includes:

ulPktNum: a total number of the received pocket in the uplink;

ulPktLenSum: a total length of all the packets including the payload in the uplink;

ulNZeroPktNum: a total number of a received packet including the payload in the uplink (a non-pure ACK packet)

ulNZeroDupPktNum1, ulNZeroDupPktNum2: a number of a packet which is determined to be retransmitted in the number of the packet of which the payload is not zero (ulNZeroDupPktNum1 corresponds to a direction from the UE to the IuPS, and ulNZeroDupPktNum2 corresponds to a direction from the IuPS to the CP);

ulDisorderPktNum: a number of a temporary disorder packet in the uplink;

ulBurstTs: a previous start time stamp in a burst state;

ulPrevNZeroPktTs: a time stamp of a previous received packet including the payload in the uplink;

ulBurstDurationSum: a total burst time in the uplink;

ulSleepDurationSum: a total sleep time in the uplink;

ulBurstNum: a total number of a burst sample in the uplink;

ulSleepNum: a total number of a sleep sample in the uplink;

ulNextSeqExp: a next expected packet sequence number after a current packet is received in the uplink;

ulHoles: an uplink packet sequence number hole list, a record format of each element in the uplink packet sequence number hole list is {start sequence number, end sequence number, packet aging time};

ulPrevAck: a previous acknowledged packet sequence number in the uplink. Of course, this ACK is included in a downlink packet. Any packet simultaneously includes a packet sequence number in this direction and acknowledgement of the packet sequence number in an opposite direction, a simple fact of this TCP is a key to understand the module 105;

ulCapLostPktNum: a total number of a lost packet in the uplink due to a deficient packet capture process.

The above description aims at an uplink variable, and aiming at a downlink variable a naming way and a meaning may be totally symmetric to the uplink variable, just changing a prefix to dl, for example dlHoles is a downlink packet sequence number hole list.

Step 302: whether a currently arrived packet is an uplink packet or a downlink packet is determined. If the current arrived packet is the uplink packet, then the uplink variable is updated, otherwise the downlink variable is updated. Because the uplink and the downlink are symmetric, all the steps below are assumed to be processed aiming at the uplink packet.

Step 303: ulPktNum is updated, 1 is added to a current value; if the payload of the current packet is 0, then step 314 is executed, otherwise step 304 is executed.

Step 304: first the following variables are updated, including:

ulNZeroPktNum: 1 is added to the current value;

ulPktLenSum: a byte length of the newly arrived packet is added to the current value;

then a difference value between a time stamp of the current packet and ulPrevNZeroPktTs is determined, if the difference value is less than X seconds (X is a parameter, and represents how long a time period is, it denotes to enter a sleep state if no packet is received within the time period), the step 305 is executed, otherwise step 306 is executed.

Step 305: a currently remaining burst sends a state of the network packet, a sleep state is not switched to, ulPrevNZeroPktTs is updated to a current time stamp of a newly arrived packet, and then step 307 is executed.

Step 306: the sleep state is switched to, which denotes a new sleep sample and burst sample are generated, of which duration time is Now-ulPrevNZeroPktTs and Now-ulBurstTs-ulPrevNZeroPktTs separately.

Current values of ulBurstNum and ulSleepNum are updated, by adding 1 to an original value.

Values of ulBurstDurationSum and ulSleepDurationSum are updated, by adding a time length of a new sleep sample and the time length of a new burst sample to the original value.

ulPrevNZeroPktTs and ulBurstTs are updated, both of them are updated to the current time stamp of a newly arrived packet, and then step 307 is executed.

Step 307: the aging time of all the packets in a current uplink packet hole is updated by adding 1 to the original value. The aging time takes a number of the packet as a unit, and denotes how many packets pass in the uplink, and arrival of the packet contained in a packet hole is still not observed after the packets pass.

Step 308: the packet sequence number of the currently arrived packet is compared with ulNextSeqExp, to determine whether the packet sequence number of the current packet is just an expected packet sequence number or not.

The current packet sequence number is compared with the expected packet sequence number, if the current packet sequence number is equal to the expected packet sequence number, then ulNextSeqExp is updated to a value of the packet sequence number of the current packet adding the packet length of the current packet, and step 314 is executed; if the current packet sequence number is greater than the expected packet sequence number, then step 309 is executed; if the current packet sequence number is less than the expected packet sequence number, then step 310 is executed.

It shall be noted that all sequence number operations shall consider a problem of rolling back of a sequence number space. A maximum sequence number of the TCP is 4294967295, and a next sequence number rolls back to 0. Subtraction operation cannot be directly performed on sequence number comparison.

Step 309: this step denotes the currently arrived packet is not the expected packet, and is a packet arrived in advance; a new hole is generated in the sequence number space, and the new hole is added to a packet sequence number hole list; a left border of the new hold is ulNextSeqExp, a right border is the sequence number of the current packet, and the aging time is 0. ulNextSeqExp is updated to the value of the packet sequence number of the current packet pulsing the packet length of the current packet, and step 314 is executed.

Step 310: this step denotes that the currently arrived packet is an out-dated packet in the sequence number space. Whether the sequence number of the current packet is in the sequence number hole or not is determined, if the sequence number is not in the sequence number hole, then step 311 is executed; if the current sequence number is in the sequence number hole, and the aging time of this hole is greater than or equal to 3, then step 312 is executed; otherwise, step 313 is executed.

Step 311: this step denotes that the sequence number of the current packet has been observed, and this packet is a retransmitted packet. With regard to the uplink, this means packet loss occurs in a link from the IuPS to the CP (a downstream link), a retransmission counter ulNZeroDupPktNum2 is updated by adding 1 to the original value, and step 314 is executed.

Step 312: this step denotes that an older sequence number hole in the packet hole is filled up. With regard to the uplink, this means that the packet loss has occurred in the link from the UE to the IuPS (a upstream link), resulting in that a packet capture point does not observe this lost packet (or continues several packets), finally in a retransmission mechanism, the UE retransmits the lost packet in sequence, while this time the packet is not lost again in the upstream link, and thereby the sequence number hole is filled up.

After the hole is filled up, the packet sequence number hole list is needed to be updated, a possible circumstance includes contraction of the hole (namely what an arrived packet fills up is a left border and a right border of the hole) or fission of the hole (namely what an arrived packet fills up is a middle part of the hole).

The retransmission counter ulNZeroDupPktNum1 is updated by adding 1 to the original value, and step 314 is executed.

Step 313: this step denotes that soon after a hole is generated, the hole is filled up immediately. This means temporary disorder transmission occurs in the upstream link (the later comes first), after the packet sequence number hole list is updated (a contraction or fission operation), ulDisorderPktNum is updated to by adding 1 to the original value, and step 314 is executed.

Step 314: a response ACK number to the downlink included in the uplink packet is compared with the downlink dlPrevAck, if the ACK is lesser than or equal to dlPrevAck, then it denotes that this ACK is out-dated or duplicated, at this time the processing is not performed, and step 316 is executed; otherwise, step 315 is executed.

Step 315: the ACK number included in the current packet is compared with the current sequence number hole dlHoles, dlCapLostPktNum is updated and simultaneously the packet sequence number hole list dlHoles is updated according to the number of the hole acknowledged by the ACK.

These acknowledged sequence number holes are not observed on the interface for packet capture, but are acknowledged by an opposite side, this means that these packets actually pass through the interface for packet capture and reach the opposite side successfully, and are just lost during the packet capture process, and corresponding packet data are written into a file for packet capture, and thus it seems a hole is generated in the sequence number space.

Step 316: whether a current stream is ended or not is determined. If still no new packet arrives the TCP connection when a certain threshold time (which can be set) passes, then a final index calculation is performed (a packet loss rate, a retransmission rate, a disorder rate, a packet loss rate of packet capture, a service module, and etc. which are not significantly introduced), and processing is ended; otherwise step 302 is executed, to continuously process a next packet circularly.

The above steps of making a statistic of the service module related index in the sleep state or the burst state, namely the above step 304 to step 306 may also be substituted by adopting the following steps:

Step 304: first, the following variables are updated, including:

ulNZeroPktNum: 1 is added to a current value;

ulPktLenSum: a byte length of the newly arrived packet is added to the current value;

then whether an arrived packet is in a current time statistic interval which takes an integral second as a head and a tail and of which the length is X seconds (X is an parameter, and denotes how long a time period is, it denotes that a sleep state is entered if no packet is received within the time period). For example, if X is 1 second, and this connection begins at a 3.2nd second, then the first statistic interval is from a 3rd second to a 4th second, the second statistic interval is from a 4th second to a 5th second, the packet arrived at a 5.8th second belongs to an interval from the 5th second to a 6th second, and so on. If the time stamp of the current packet is still in the current time statistic interval, then step 305 is executed, otherwise if the time stamp of the current packet is in a next or next several time statistic intervals, then step 306 is executed.

Step 305: the number of the packet in the current time statistic interval is added by 1, then step 307 is executed. In a certain time statistic interval, if the number of the arrived non-pure ACK packet is greater than 0, it denotes that this interval is a non-sleep interval.

Step 306: if the time statistic interval in which the current packet is and the time statistic interval in which the previous packet is located are continuous, it denotes that the current time statistic interval is also in the non-sleep state, and the TCP connection is always in the burst state. Otherwise, it denotes that the connection experiences the sleep state, these intervals between the current time statistic interval and the time statistic interval in which the previous packet is located are taken as a sleep sample for statistic.

When performing the index statistic finally, all intervals are scanned, a sum of the interval in which the number of the packet is not 0, is taken as ulBurstNum, the sum of other intervals is taken as ulSleepNum. In addition, ulBurstDurationSum=ulBurstNum*X second, and ulSleepDurationSum=ulSleepNum*X second. A downlink direction is similar to this.

Figure 5:
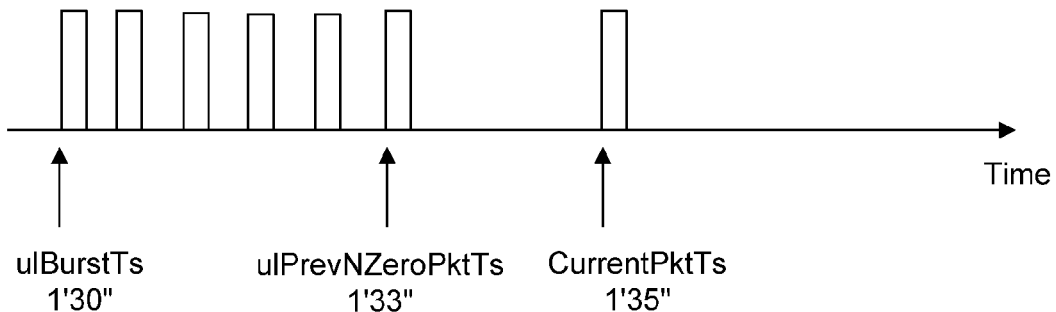
FIG. 5 is a view of a burst and dormancy state which is provided in an embodiment of the disclosure.

FIG. 5 is a view of a burst and sleep state provided in an embodiment of the disclosure, as shown in FIG. 5, if a time period of sleep is passed, and there is burst packet retransmission in the connection, the time stamp ulBurstTs of the first packet thereof is 1 minute and 30 seconds, in a period of time after this, further 5 packets of which the payload is not 0 arrive in sequence, a deference of arriving time between each packet and a previous packet is less than 1 seconds. Wherein, a 6th packet is the packet arrived last, and a corresponding ulPrevNZeroPktTs is 1 minute and 33 seconds. Then after 2 seconds, a 7th packet arrives, and the current time stamp thereof is 1 minute and 35 seconds.

When the 7th packet arrives, it denotes that a sample in a sleep period is generated and the time length is 2 seconds, and simultaneously it also denotes that a burst sample constructed by the previous 6 packets is ended, a burst time length is 3 seconds. Both the time stamps of ulBurstTs and ulPrevNZeroPktTs are updated to the current time stamp of the 7th packet, namely 1 minute and 35 seconds, and determination of a next burst and sleep state is entered.

Figure 6A:
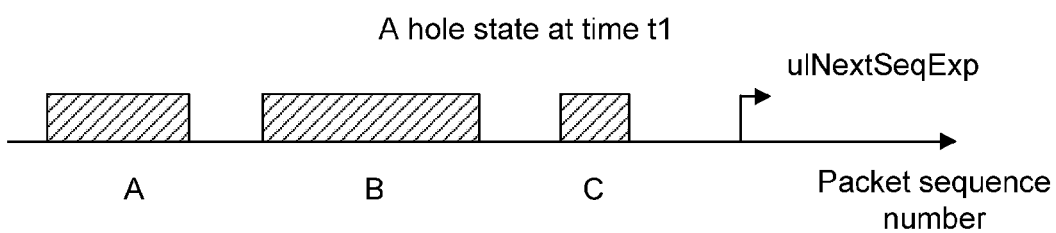
FIG. 6($a$) is a view of a state of a transmission sequence number hole at a time t1 which is provided in an embodiment of the disclosure.
Figure 6B:
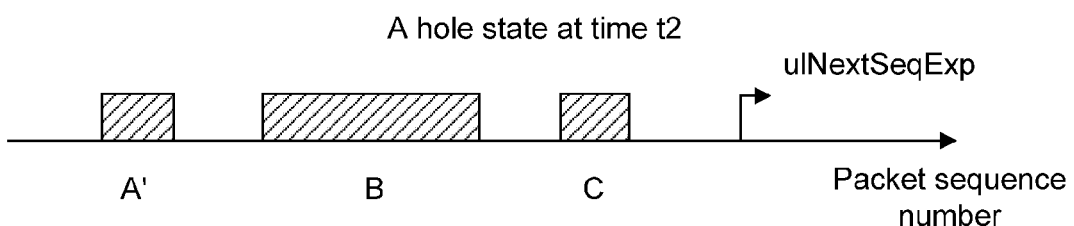
Figure 6C:
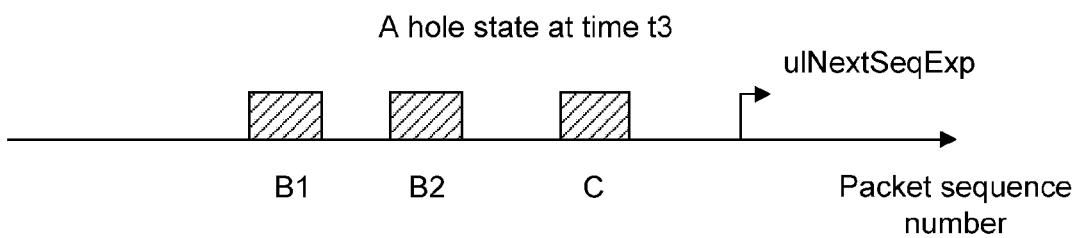

FIG. 6(a) is a view of a state of a transmission sequence number hole at a time t1 which is provided in an embodiment of the disclosure, as shown in FIG. 6(a), at a certain time t1, in a observed sequence number space, there are three holes, all of which are represented by shadows. Wherein, a hole A is caused by loss of two continuous packets; a hole B is caused by loss of three continuous packets; a hole C is caused by loss of one packet. At a time t2, as shown in FIG. 6(b), a part of the hole A is filled up, this is a circumstance of hole contraction. At a time t3, as show in FIG. 6(c), the hole A is filled up completely, a part of data B in the middle of B are filled up, this is a circumstance of hole fission.

In conclusion, the disclosure provides a result of evaluating performance of a TCP capillary channel by automatically processing network interface packet capture data, so as to provide a meaningful Quality of Service (QoS) index in a dimension of each capillary channel of each mobile user, these index may be used to support an extensive classification and aggregation analysis, thus providing abundant data support for whole network performance evaluation, performance evaluation of user dimension, user perception monitor and evaluation of a whole network fine granularity.

Although detail description of the disclosure is performed above, the disclosure is not limited to this, and various modifications can be made by those skilled in this art according to the principle of the disclosure. Therefore, any modification, alternation, improvement and the like which are made in accordance with the principle of the disclosure shall be contained within the scope of protection of the disclosure.

INDUSTRIAL APPLICABILITY

In an embodiment of the disclosure, whether a network packet includes a payload or not is determined, after obtaining the network packet on a wireless network capillary channel; when it is determined that the network packet includes the payload, retransmission rate and packet loss rate statistic processing, disorder rate statistic processing, and packet capture process packet loss rate statistic processing are performed; and when it is determined that the network packet does not include the payload, the packet capture process packet loss rate statistic processing directly performed; in this way, evaluation of channel performance in a finer layer can be performed better.

What is claimed is:

1. A method for evaluating performance of a wireless network capillary channel, wherein the capillary channel is a Transmission Control Protocol (TCP) connection initiated by a user, the method comprising:
   determining whether a network packet includes a payload or not, after obtaining the network packet on the wireless network capillary channel;
   when determining that the network packet includes the payload, performing retransmission rate and packet loss rate statistic processing, disorder rate statistic processing, and packet capture process packet loss rate statistic processing; and
   when determining that the network packet does not include the payload, directly performing the packet capture process packet loss rate statistic processing;
   the method further comprising:
   performing service module related index statistic processing; which comprises: calculating a time difference between the network packet and a previous packet of the network packet which includes the payload, comparing the obtained time difference with a predetermined time difference, making a statistic of a service module related index of a sleep state or a burst state according to a compare result, and making a statistic of aging time of all packets in a packet sequence number hole list;
   the method further comprising:
   comparing a packet sequence number of the network packet with a next expected packet sequence number:
   when the packet sequence number of the network packet is less than the next expected packet sequence number, performing the retransmission rate and packet loss rate statistic processing, and the disorder rate statistic processing;
   when the packet sequence number of the network packet is equal to the next expected packet sequence number, updating the next expected packet sequence number to a sum of the packet sequence number and a packet length of the network packet, and performing the packet capture process packet loss rate statistic processing; and
   when the packet sequence number of the network packet is greater than the next expected packet sequence number, updating the next expected packet sequence number to the sum of the packet sequence number and the packet length of the network packet, and adding a newly generated hole into a packet sequence number hole list.

2. The method according to claim 1, further comprising: performing service module related index statistic processing; which comprises:
   determining whether a time statistic interval in which the network packet is located and a time statistic interval of a previous packet of the network packet which includes the payload are continuous or not, making a statistic of a service module related index of a sleep state or a burst state and making a statistic of aging time of all packets in a packet sequence number hole list according to a determination result.

3. The method according to claim 1, wherein the performing the retransmission rate and packet loss rate statistic processing comprises:
when the packet sequence number of the network packet is in the packet sequence number hole list and aging time is greater than predetermined aging time, making a statistic of a retransmission packet number of an upstream/downstream packet which includes the payload; and when the packet sequence number of the network packet is not in the packet sequence number hole list, making a statistic of the retransmission packet number of a downstream/upstream packet which includes the payload.

4. The method according to claim 1, wherein the performing the disorder rate statistic processing comprises:
when the packet sequence number of the network packet is in the packet sequence number hole list and aging time is less than predetermined aging time, making a statistic of a number of a transient disorder packet.

5. The method according to claim 1, wherein the performing the packet capture process packet loss rate statistic processing comprises:
when an uplink/downlink Acknowledgement (ACK) number included in the network packet is greater than a previous downlink/uplink acknowledged packet sequence number, comparing the uplink/downlink ACK number included in the network packet with a hole sequence number in the packet sequence number hole list; according to a comparison result, making a statistic of a total number of a lost packet during a packet capture process, and updating the packet sequence number hole list.

6. An apparatus for evaluating performance of a wireless network capillary channel, wherein the capillary channel is a Transmission Control Protocol (TCP) connection initiated by a user, the apparatus comprising:
a memory storing programming instructions; and
a processor configured to be capable of executing the stored programming instructions to:
determine whether a network packet includes a payload or not, after obtaining the network packet on the wireless network capillary channel;
perform retransmission rate and packet loss rate statistic processing when determining that the network packet includes the payload;
perform disorder rate statistic processing when determining that the network packet includes the payload; and
perform packet capture process packet loss rate statistic processing; and
a processor further configured to be capable of executing the stored programming instructions to:
compare a packet sequence number of the network packet with a next expected packet sequence number;
when the packet sequence number of the network packet is less than the next expected packet sequence number, perform the retransmission rate and packet loss rate statistic processing, and the disorder rate statistic processing;
when the packet sequence number of the network packet is equal to the next expected packet sequence number, update the next expected packet sequence number to a sum of the packet sequence number and a packet length of the network packet, and perform the packet capture process packet loss rate statistic processing; and
when the packet sequence number of the network packet is greater than the next expected packet sequence number, update the next expected packet sequence number to the sum of the packet sequence number and the packet length of the network packet, and add a newly generated hole into a packet sequence number hole list.

7. The apparatus according to claim 6, wherein the processor is further configured to be capable of executing the stored programming instructions to perform service module related index statistic processing;
when performing the service module related index statistic processing, the processor is configured to be capable of executing the stored programming instructions to:
calculate a time difference between the network packet and a previous packet of the network packet which includes the payload, compare the obtained time difference with a predetermined time difference, make a statistic of a service module related index of a sleep state or a burst state according to a compare result, and make a statistic of aging time of all packets in a packet sequence number hole list.

8. The apparatus according to claim 6, wherein the processor is further configured to be capable of executing the stored programming instructions to perform service module related index statistic processing;
when performing the service module related index statistic processing, the processor is configured to be capable of executing the stored programming instructions to:
determine whether a time statistic interval in which the network packet is located and a time statistic interval of a previous packet of the network packet which includes the payload are continuous or not, make a statistic of a service module related index of a sleep state or a burst state and make a statistic of aging time of all packets in a packet sequence number hole list according to a determination result.

9. The apparatus according to claim 6, wherein when performing the retransmission rate and packet loss rate statistic processing, the processor is configured to be capable of executing the stored programming instructions to:
when the packet sequence number of the network packet is in the packet sequence number hole list and aging time is greater than predetermined aging time, make a statistic of a retransmission packet number of an upstream/downstream packet which includes the payload; and when the packet sequence number of the network packet is not in the packet sequence number hole list, make a statistic of the retransmission packet number of a downstream/upstream packet which includes the payload.

10. The apparatus according to claim 6, wherein when performing the disorder rate statistic processing, the processor is configured to be capable of executing the stored programming instructions to:
when the packet sequence number of the network packet is in the packet sequence number hole list and aging time is less than predetermined aging time, make a statistic of a number of a transient disorder packet.

11. The apparatus according to claim 6, wherein when performing the packet capture process packet loss rate statistic processing, the processor is configured to be capable of executing the stored programming instructions to:
when an uplink/downlink Acknowledgement (ACK) number included in the network packet is greater than a previous downlink/uplink acknowledged packet sequence number, compare the uplink/downlink ACK number included in the network packet with a hole sequence number in the packet sequence number hole list; according to a comparison result, make a statistic of a total number of a lost packet during a packet capture process, and update the packet sequence number hole list.

* * * * *